Oct. 18, 1955 W. J. BILLERBECK 2,721,022
SHIPPING CARTON
Filed Nov. 1, 1951 2 Sheets-Sheet 1

INVENTOR.
William J. Billerbeck
BY
Wilfred E. Lawson
ATTORNEY

Oct. 18, 1955     W. J. BILLERBECK     2,721,022
SHIPPING CARTON
Filed Nov. 1, 1951     2 Sheets-Sheet 2
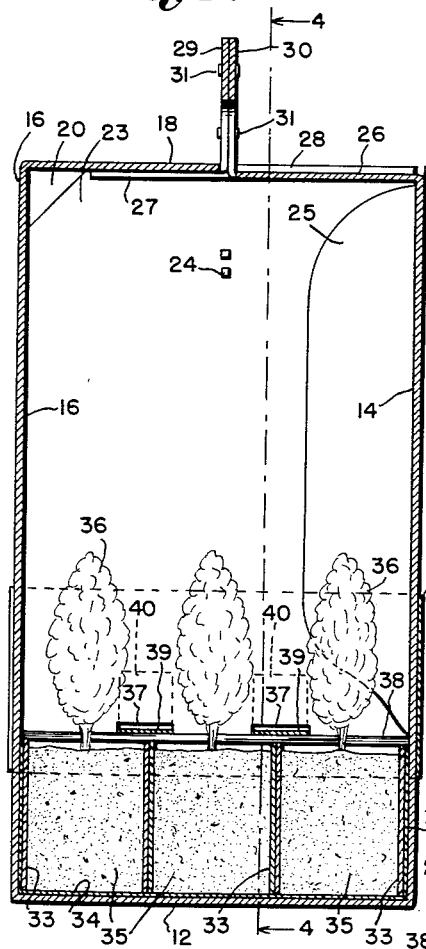
FIG. 3.
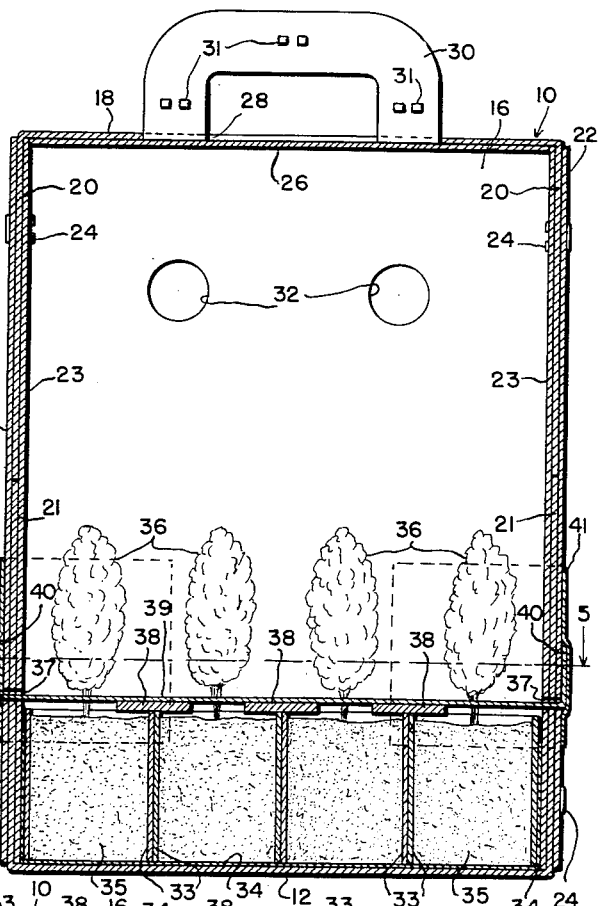
FIG. 4.
FIG. 5.
INVENTOR.
William J. Billerbeck
BY
Wilfred E. Lawson
ATTORNEY

United States Patent Office 2,721,022
Patented Oct. 18, 1955

2,721,022

SHIPPING CARTON

William J. Billerbeck, Waynesboro, Pa.

Application November 1, 1951, Serial No. 254,255

1 Claim. (Cl. 229—52)

This invention relates generally to the class of paper receptacles and is directed particularly to paper receptacles employed for shipping commodities by mail or express.

The present invention is directed particularly to improvements in receptacles designed particularly for the shipping of small plants.

At the present time nurserymen engage in the extensive shipping by mail or express of small plants and it is important that such plants reach their destination in the quickest possible time and without damage. This requires rapid handling of the box or carton in which the plants are placed for shipment and as a result such handling is frequently of such a nature as to cause the plants to be shaken loose from the individual receptacles in which they are placed with the result that they reach their destination either dead or in poor condition.

A principal object of the present invention is to provide an improved means whereby plants may be shipped in individual receptacles in the shipping containers, in such a manner that the individual receptacles cannot become separated or broken even though the receptacle may receive rough handling or even be upset from the normal position in which it is intended to be maintained while in transit.

Another object of the invention is to provide an improved means for securing individual receptacles in shipping containers, which is so designed that the receptacles can be placed in the shipping containers in the normal or customary manner and secured in position therein with a minimum of labor and without danger of injuring the plants while being so secured.

A still further object of the invention is to provide means for securing individual plant containers in a shipping receptacle in such a manner that while the containers are maintained firmly in place, the tops thereof will not be completely covered so as to prevent the plants receiving the necessary air and water while in transit.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 3 is a vertical sectional view taken through the closed, ready to ship container, substantially on the line 3—3 of Figure 2.

Figure 4 is a vertical sectional view taken substantially on the line 4—4 of Figure 3.

Figure 5 is a horizontal section taken substantially on the line 5—5 of Figure 4.

Figure 1:
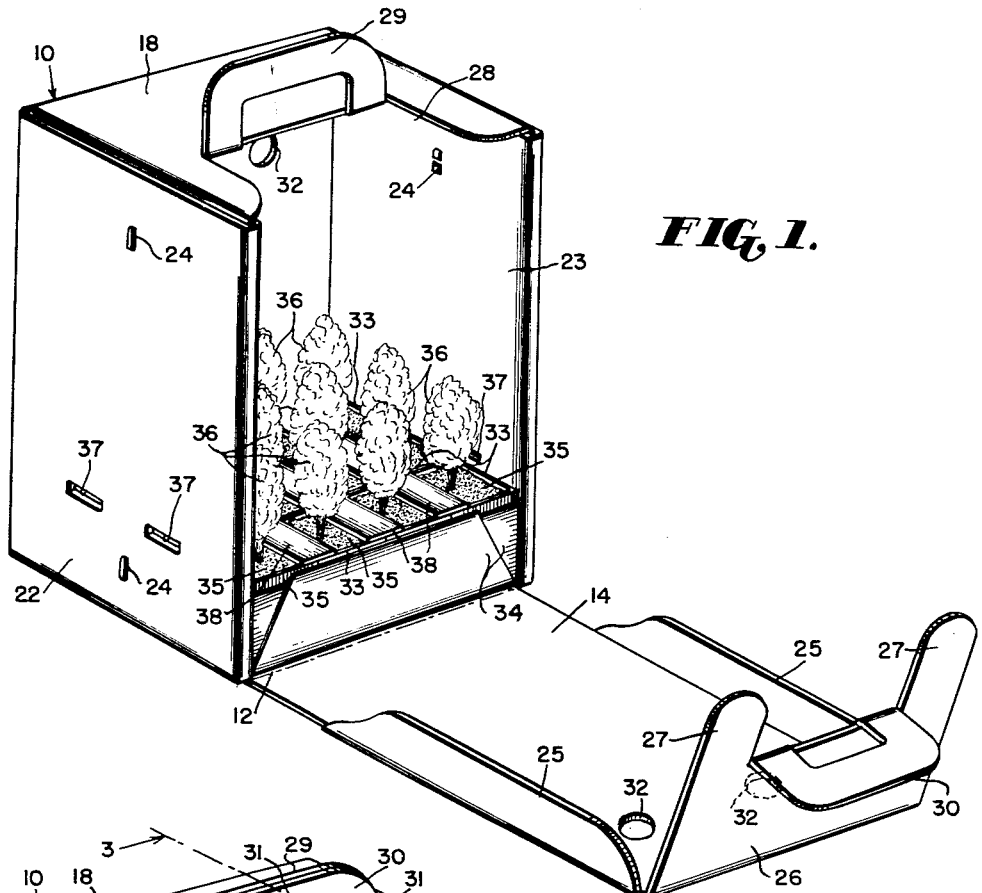
Figure 1 is a view in perspective of a plant shipping container showing a plurality of plant receptacles, with plants, in the container and showing one stage in the carrying out of the present invention for maintaining the plant receptacles in place in the container.
Figure 2:
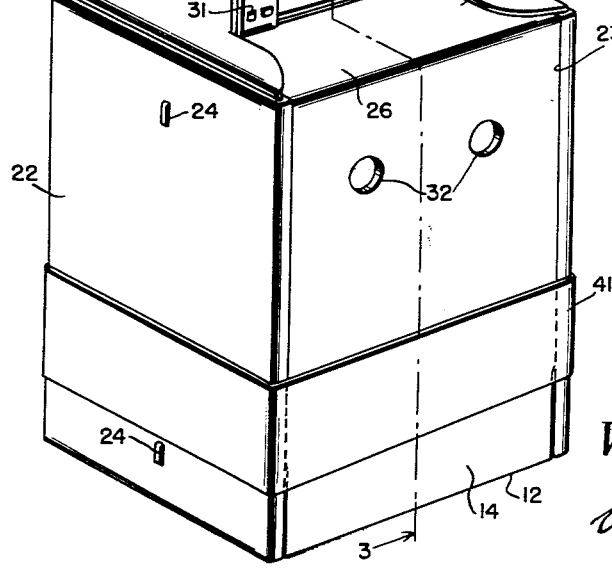
Figure 2 is a view in perspective of the container as it appears after being closed and sealed ready for shipment.

Referring now more particularly to the drawings the numeral 10 generally designates a shipping container of standard construction, which is formed of pressboard or corrugated paper board. This container comprises a bottom wall 12, the front edge of which is attached to the bottom edge of the front wall 14 which also functions as the cover or door for the receptacle while from the rear or back edge of the bottom 12 there extends upwardly the integral back wall 16 which at its top is integral with the top wall 18.

Extending downwardly from the two sides of the front wall 18 and formed integral with such side edges, is a side wall flap 20 which has a length approximating half the height of the receptacle while there extends upwardly from each side edge of the bottom wall 12 a corresponding side wall flap 21. These side wall flaps are in edge to edge relation in the set-up box.

Formed integrally with each vertical side edge of the back wall 16 is an outer side wall 22 which overlies the outer sides of the adjacent flaps 20—21 and this outer side wall 22 has integral with it an inner side wall which is turned back into the receptacle to lie against the inner sides of the adjacent flaps 20—21 as indicated at 23. Thus each side of the shipping receptacle or container is of three ply thickness, comprising the central thickness made up of the two edge opposed flaps 20 and 21, the outer wall sheet 22 and the reversely turned inner wall sheet 23. These three plys of material are joined together by a conventional securing staple 24 or other suitable means.

The front wall or closure 14 is folded upwardly as will be readily apparent from Figure 1 and is provided with the side edge wings 25 which extend into the receptacle on the inner sides of the side walls and with the top flap 26 which at each side has the tongues 27.

As shown the top wall 18 is cut back from the forward or front edge forming the recess 28, along the inner edge of which is formed a carrying loop 29 and when the cover 14 is closed the flap 26 extends inwardly under the portions of the top wall 18 bordering the sides of the recess 28 and the free transverse edge of the flap 26, between the tongues 27 has joined thereto a carrying loop or handle 30 which positions against the loop 29 and these are then secured together by conventional staples 31 or other suitable means.

The front and back walls, or the cover 14 which forms the front wall, and the back wall 16, have air admission or ventilation openings 32 therein.

As is shown the receptacle or shipping container as thus described is of substantially square cross sectional form and is of materially greater height than thickness. It is to be understood, however, that while a particular type of receptacle or shipping container has been disclosed, which is preferred, the invention is not limited to a container of the specific form illustrated and described.

In accordance with conventional practice the area of the bottom 12 of the container is of a size to have set snugly within the container a predetermined number of individual plant receptacles 33. In the present illustration of the invention twelve of such plant receptacles are shown, which are of rectangular cross sectional design so that they fit snugly together to form a square block fitting in the receptacle on the bottom wall 12. This group or block of individual plant receptacles is customarily enclosed around its sides and across the bottom in a suitable heavy paper wrapping 34 which assists in conserving the moisture content of the soil 35 with which the individual receptacles 33 are filled and in which the plants 36 are planted.

In carrying out the present invention the side walls of the shipping container are provided with slots 37, here shown as two in number in each side wall for a receptacle designed to carry twelve individual plant containers. These slots are equidistantly spaced from the front and back edges of the wall and from one another and are positioned in a horizontal plane lying slightly above the plane of the tops of the individual plant receptacles 33.

After the plant containers have been placed in position in the shipping receptacle three strips of cardboard 38, thin wood or other suitable material are placed across the tops of the plant containers 33 to extend from the front to the back of the shipping container, each strip resting upon the adjacent top edges of three plant containers 33 and passing between two rows of three plants each as shown in Figure 1. After these strips 38 are placed in position to rest upon the tops of the containers between the groups of trees there are then extended through the shipping container, through aligned slots 37 in the two opposite side walls, the metal hold-down strips 39 which pass over and rest upon the tops of the container supported strips 38.

The hold-down strips 39 are of a length materially greater than the overall width of the shipping container so that end portions of the hold-down strips 39 remain to be bent or turned upwardly against the outer sides of the side walls of the shipping container as indicated at 40.

As will be readily seen upon reference to Figure 5 each metal hold-down strip 39 passes between and separates two groups of four plants each, thereby coacting with the strips 38 to segregate each plant in a small encompassing area from the adjacent plants.

After the hold down strips have been placed in position and the ends thereof turned upwardly against the outer sides of the shipping container, the front wall 14 of the shipping container is closed and the handle loops stapled together, whereupon an adhesive sealing band 41 of paper or other suitable material is placed around the body of the shipping container across the closure wall 14 and across the turned up ends 40 of the hold-down strips, thereby hiding such ends and not only reducing the possibility of any one tampering with the strips but also eliminating the possibility of the ends becoming caught in the clothing of persons handling the shipping container, or in other objects.

From the foregoing it will be readily apparent that there is provided by the present invention an effective and novel means of securing in a shipping container, a plurality of individual receptacles in such a manner that they cannot become loose and damaged.

I claim:

In a shipping carton, a rectangular body comprising a bottom wall, a back wall upturned from the rear edge of the bottom wall, a top wall portion inturned from the upper edge of the back wall, a closure wall upturned from the front edge of the bottom wall, a second top wall portion inturned from the upper edge of the closure wall, a side wall portion downturned from each of the side edges of the first top wall portion, a second side wall portion upturned from each of the side edges of the bottom wall, said side wall portions having the end edges thereof abutting substantially in the plane of the horizontal center of the body, a side wall inturned from each of the vertical side edges of the back wall, a second side wall inturned from each of the outer vertical side edges of the first side wall and extending inwardly of the body into overlying relation with respect to the said side wall portions, means securing said side wall portions and said side walls together, relatively narrow wings inturned from the vertical side edges of the closure wall and projecting into the body in overlapping relation with respect to said second side wall, said top wall portions having recesses formed centrally in the inwardly directed edges thereof, and loops, constituting jointly a carrying hand grip, formed with and upturned from the opposed inner edges of the recesses into side-to-side relation, in which relation, the latter edges are abutted substantially in the plane of the transverse center of the body, the portions of the first top wall portion at opposite sides of the recess therein extending forwardly to points of meeting with the front vertical edges of the side walls and like portions at opposite sides of the recess in the second top wall portion projecting into the body in underlying relation with respect to the said portions of the first top wall portion.

References Cited in the file of this patent

UNITED STATES PATENTS

| Re. 19,525 | Juffa | Apr. 9, 1935 |
| 1,469,536 | Risley | Oct. 2, 1923 |
| 1,522,311 | MacLellan | Jan. 6, 1925 |
| 1,833,441 | Slack | Nov. 24, 1931 |
| 2,180,691 | Olivier | Nov. 21, 1939 |
| 2,351,207 | Henderson | June 13, 1944 |
| 2,358,295 | Bacigalupi | Sept. 19, 1944 |
| 2,444,326 | Baker | June 29, 1948 |